United States Patent
Tepper et al.

(10) Patent No.: US 11,797,516 B2
(45) Date of Patent: Oct. 24, 2023

(54) DATASET BALANCING VIA QUALITY-CONTROLLED SAMPLE GENERATION

(71) Applicant: International Business Machines Corporation, Armonk, NY (US)

(72) Inventors: Naama Tepper, Koranit (IL); Esther Goldbraich, Haifa (IL); Boaz Carmeli, Koranit (IL); Naama Zwerdling, Haifa (IL); George Kour, Tel Aviv (IL); Ateret Anaby Tavor, Givat Ada (IL)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 17/317,922

(22) Filed: May 12, 2021

(65) Prior Publication Data

US 2022/0374410 A1 Nov. 24, 2022

(51) Int. Cl.
G06F 16/23 (2019.01)
G06N 20/00 (2019.01)

(52) U.S. Cl.
CPC ......... G06F 16/2365 (2019.01); G06N 20/00 (2019.01)

(58) Field of Classification Search
CPC .. G06F 16/2365; G06F 16/285; G06F 16/906; G06N 20/00
See application file for complete search history.

(56) References Cited

U.S. PATENT DOCUMENTS 9,037,518 B2 * 5/2015 Lakshminarayan ... G06N 20/00 706/12
11,423,264 B2 * 8/2022 Badjatiya ............. G06K 9/6271
(Continued)

FOREIGN PATENT DOCUMENTS

| CN | 103716204 A | * | 4/2014 | |
| CN | 104239516 A | * | 12/2014 | ....... G06F 17/30371 |

(Continued)

OTHER PUBLICATIONS

C. Yu, F. Li, G. Li and N. Yang, "Multi-classes Imbalanced Dataset Classification Based on Sample Information," 2015 IEEE 17th International Conference on High Performance Computing and Communications, 2015, pp. 1768-1773, doi: 10.1109/HPCC-CSS-ICESS.2015.327. (Year: 2015).*

(Continued)

*Primary Examiner* — Dennis Truong
(74) *Attorney, Agent, or Firm* — Dvir Gassner (57) ABSTRACT

Balancing an imbalanced dataset, by: Receiving a balancing policy and the imbalanced dataset. Performing initial adjustment of the imbalanced dataset to comply with the balancing policy, by: oversampling one or more underrepresented classes, and, if one or more of the classes are overrepresented, undersampling them. Operating a generative machine learning model to generate samples for the one or more underrepresented classes, based on the initially-adjusted dataset. Operating a machine learning classification model to label the generated samples with class labels corresponding to the one or more underrepresented classes. Selecting some of the generated samples which, according to the labeling, have a relatively high probability of preserving their class labels. Composing a balanced dataset which complies with the balancing policy and comprises: the samples belonging to the one or more underrepresented classes, the selected generated samples, and an undersampling of the samples belonging to the one or more overrepresented classes.

20 Claims, 3 Drawing Sheets

(56) References Cited

U.S. PATENT DOCUMENTS

| | | | |
|---|---|---|---|
| 11,481,672 B2* | 10/2022 | Pham | G06F 16/24578 |
| 2009/0097741 A1* | 4/2009 | Xu | G06K 9/6252 |
| | | | 382/159 |
| 2013/0097103 A1* | 4/2013 | Chari | G06N 20/10 |
| | | | 707/E17.089 |
| 2014/0257122 A1* | 9/2014 | Ong | A61B 5/316 |
| | | | 705/2 |
| 2015/0356464 A1* | 12/2015 | Lin | G06N 20/00 |
| | | | 706/12 |
| 2016/0092789 A1* | 3/2016 | Codella | G06N 20/00 |
| | | | 706/12 |
| 2017/0132516 A1* | 5/2017 | Zhang | G06Q 30/0202 |
| 2019/0259041 A1* | 8/2019 | Jackson | G06Q 10/06315 |
| 2020/0050964 A1 | 2/2020 | Vassilev | |
| 2020/0372383 A1* | 11/2020 | Cao | G06N 20/00 |
| 2021/0117718 A1* | 4/2021 | Badjatiya | G06K 9/6271 |
| 2022/0188568 A1* | 6/2022 | Singh | G06N 3/084 |

FOREIGN PATENT DOCUMENTS

| | | | | |
|---|---|---|---|---|
| CN | 107563435 A | * | 1/2018 | |
| DE | 102021204550 A1 | * | 11/2022 | |
| WO | WO-2007115426 A2 | * | 10/2007 | G06K 9/3241 |
| WO | WO-2020188425 A1 | * | 9/2020 | |

OTHER PUBLICATIONS

Y. Pristyanto and A. Dahlan, "Hybrid Resampling for Imbalanced Class Handling on Web Phishing Classification Dataset," 2019 4th International Conference on Information Technology, Information Systems and Electrical Engineering (ICITISEE), 2019, pp. 401-406, doi: 10.1109/ICITISEE48480.2019.9003803. (Year: 2019).*

A. Agrawal, H. L. Viktor and E. Paquet, "SCUT: Multi-class imbalanced data classification using SMOTE and cluster-based undersampling," 2015 7th International Joint Conference on Knowledge Discovery, Knowledge Engineering and Knowledge Management (IC3K), 2015, pp. 226-234. (Year: 2015).*

R. Batuwita and V. Palade, "Efficient resampling methods for training support vector machines with imbalanced datasets," The 2010 International Joint Conference on Neural Networks (IJCNN), Barcelona, Spain, 2010, pp. 1-8, doi: 10.1109/IJCNN.2010.5596787 (Year: 2010).*

Aixin Sun et al., "On strategies for imbalanced text classification using SVM: A comparative study", Decision Support Systems 48 (2009) pp. 191-201.

Andrew Estabrooks et al., "A Multiple Resampling Method for Learning From Imbalanced Data Sets", Computational Intelligence, vol. 20, No. 1, 2004.

Bing Zhu et al., "An empirical comparison of techniques for the class imbalance problem in churn prediction", Information Sciences (2017).

D. Ramyachitra et al., "Imbalanced Dataset Classification and Solutions: A Review", International Journal of Computing and Business Research (IJCBR), vol. 5, Issue 4, Jul. 2014.

Gustavo Batista et al., "A Study of the Behavior of Several Methods for Balancing Machine Learning Training Data", Sigkdd Explorations, vol. 6, Issue 1 (2004) pp. 20.

Mahendra Sahare et al., "A Review of Multi-Class Classification for Imbalanced Data", International Journal of Advanced Computer Research, Sep. 2012.

Mateusz Buda et al., "A systematic study of the class imbalance problem in convolutional neural networks", Neural Networks (2018).

Naama Tepper et al., "Balancing via Generation for Multi-Class Text Classification Improvement", Findings of the Association for Computational Linguistics: EMNLP 2020, pp. 1440-1452, Nov. 2020.

Nitesh V Chawla et al., "Editorial: Special Issue on Learning from Imbalanced Data Sets", ACM SIGKDD Explorations Newsletter, Jun. 2004.

Shuo Wang et al., "Diversity Analysis on Imbalanced Data Sets by Using Ensemble Models", 2009 IEEE Symposium on Computational Intelligence and Data Mining (CIDM 2009) Proceedings, Mar. 2009.

Ying Liu et al., "Imbalanced text classification: A term weighting approach", Expert Systems with Applications 36 (2009) pp. 690-701.

Zhaohui Zheng et al., "Feature Selection for Text Categorization on Imbalanced Data", ACM SIGKDD Explorations Newsletter, Jun. 2004.

* cited by examiner

DATASET BALANCING VIA QUALITY-CONTROLLED SAMPLE GENERATION

BACKGROUND

The invention relates to the field of machine learning.

The class imbalance problem is well known in the machine learning field. This problem arises when a certain dataset, intended to be used for training a certain machine learning model (e.g., a classifier), includes a vastly different number of samples for different ones of the classes, making one or more of the classes greatly underrepresented.

The class imbalance problem causes significant difficulties in achieving ultimate classification performance, as classifiers tend to be biased towards larger classes. Moreover, it is often the underrepresented classes which are critical to correctly identify in real-life applications, but the naturally low number of samples in these classes during training makes it difficult to produce a classifier which can classify such minority samples well enough later on. For example, in fields such as fraud detection, disease diagnosis, cyber security, and many others, it is often much easier to collect samples associated with normal situations (e.g., legitimate transactions, healthy test results, or legitimate network packets) than samples associated with problematic ones (e.g., fraudulent transactions, pathological test results, or illegitimate network packets).

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a computer-implemented method which includes: Receiving a balancing policy and an imbalanced dataset that comprises samples distributed unequally between different classes. Automatically performing initial adjustment of the imbalanced dataset to comply with the balancing policy, by: oversampling one or more of the classes which are underrepresented in the imbalanced dataset, and if one or more of the classes are overrepresented in the imbalanced dataset, undersampling the one or more overrepresented classes. Operating a generative machine learning model to generate samples for the one or more underrepresented classes, based on the initially-adjusted dataset. Operating a machine learning classification model to label the generated samples with class labels corresponding to the one or more underrepresented classes. Selecting some of the generated samples which, according to the labelling, have a relatively high probability of preserving their class labels, compared to other ones of the generated samples. Composing a balanced dataset which complies with the balancing policy and comprises: the samples from the imbalanced dataset belonging to the one or more underrepresented classes; the selected generated samples; and, if one or more of the classes are overrepresented in the imbalanced dataset, also an undersampling of the samples belonging to the one or more overrepresented classes in the imbalanced dataset.

Another embodiment is directed to a system which includes: at least one hardware processor, and a non-transitory computer-readable storage medium having program code embodied therewith, the program code executable by said at least one hardware processor to: Receive a balancing policy and an imbalanced dataset that comprises samples distributed unequally between different classes. Automatically perform initial adjustment of the imbalanced dataset to comply with the balancing policy, by: oversampling one or more of the classes which are underrepresented in the imbalanced dataset, and if one or more of the classes are overrepresented in the imbalanced dataset, undersampling the one or more overrepresented classes. Operate a generative machine learning model to generate samples for the one or more underrepresented classes, based on the initially-adjusted dataset. Operate a machine learning classification model to label the generated samples with class labels corresponding to the one or more underrepresented classes. Select some of the generated samples which, according to the labelling, have a relatively high probability of preserving their class labels, compared to other ones of the generated samples. Compose a balanced dataset which complies with the balancing policy and comprises: the samples from the imbalanced dataset belonging to the one or more underrepresented classes; the selected generated samples; and, if one or more of the classes are overrepresented in the imbalanced dataset, also an undersampling of the samples belonging to the one or more overrepresented classes in the imbalanced dataset.

A further embodiment is directed to a computer program product comprising a non-transitory computer-readable storage medium having program code embodied therewith, the program code executable by at least one hardware processor to: Receive a balancing policy and an imbalanced dataset that comprises samples distributed unequally between different classes. Automatically perform initial adjustment of the imbalanced dataset to comply with the balancing policy, by: oversampling one or more of the classes which are underrepresented in the imbalanced dataset, and if one or more of the classes are overrepresented in the imbalanced dataset, undersampling the one or more overrepresented classes. Operate a generative machine learning model to generate samples for the one or more underrepresented classes, based on the initially-adjusted dataset. Operate a machine learning classification model to label the generated samples with class labels corresponding to the one or more underrepresented classes. Select some of the generated samples which, according to the labelling, have a relatively high probability of preserving their class labels, compared to other ones of the generated samples. Compose a balanced dataset which complies with the balancing policy and comprises: the samples from the imbalanced dataset belonging to the one or more underrepresented classes; the selected generated samples; and, if one or more of the classes are overrepresented in the imbalanced dataset, also an undersampling of the samples belonging to the one or more overrepresented classes in the imbalanced dataset.

In some embodiments, if one or more of the classes are well-represented in the imbalanced dataset, the balanced dataset further comprises the samples belonging to the one or more well-represented classes in the imbalanced dataset.

In some embodiments, the balancing policy defines a specific distribution of the samples among the different classes.

In some embodiments, the balancing policy comprises a percentile band defining a minimal and a maximal percentile of samples allowed for each of the different classes.

In some embodiments, in the initial adjustment, the oversampling comprises ruleset-based production of new samples.

In some embodiments, in the initial adjustment, the oversampling comprises machine learning-based production of new samples.

In some embodiments, in at least one of the initial adjustment and the balancing, the undersampling comprises deletion of some of the samples in the one or more overrepresented classes.

In some embodiments, in the imbalanced dataset, a ratio between an amount of samples in a smallest one of the classes and an amount of samples in a largest one of the classes is 1:2 or greater.

In some embodiments of the method, it is performed on a hardware processor of the computer in which the method is implemented.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A system, a method, and a computer program product for balancing a machine learning dataset are disclosed herein. Advantageously, these may produce a high-quality, balanced dataset which, when used for training a machine learning model, makes the model perform better.

First, a balancing policy and an imbalanced dataset may be received. The imbalanced dataset includes samples that are distributed unequally between different classes.

Then, initial adjustment of the imbalanced dataset may take place, so that the number of samples in each of the classes complies with the balancing policy. This may be performed by oversampling any underrepresented classes, and optionally also undersampling any overrepresented classes—if such exist. The undersampling and oversampling may be performed using conventional techniques, potentially even naïve ones which are known not to yield high-quality samples.

The imbalanced dataset may then be finally balanced, producing a high-quality, balanced dataset, by: Operating a generative machine learning model to generate samples for the underrepresented class(es), based on the initially-adjusted dataset. Then, operating a machine learning classification model to label the generated samples with class labels corresponding to the underrepresented class(es), such that these labels may be used to effect a quality control mechanism. Next, those of the generated samples which, according to their labeling, have a relatively high probability of preserving their class labels, may be selected. Finally, the balanced dataset may be composed, still in compliance with the balancing policy, from: the samples belonging to the underrepresented class(es), the selected generated samples, and an undersampling of the samples belonging to the overrepresented class(es) (if such exist). If, according to the balancing policy, there are also any well-represented classes (which do not require any addition or omission of samples), any samples belonging to these classes are of course also included in the composed, balanced dataset.

The balanced dataset may be used for training a machine learning classifier to classify new samples. Advantageously, such trained classifier may potentially perform better than a classifier trained on an imbalanced dataset or on a dataset which was balanced according to other techniques than the one disclosed herein.

Figure 1:
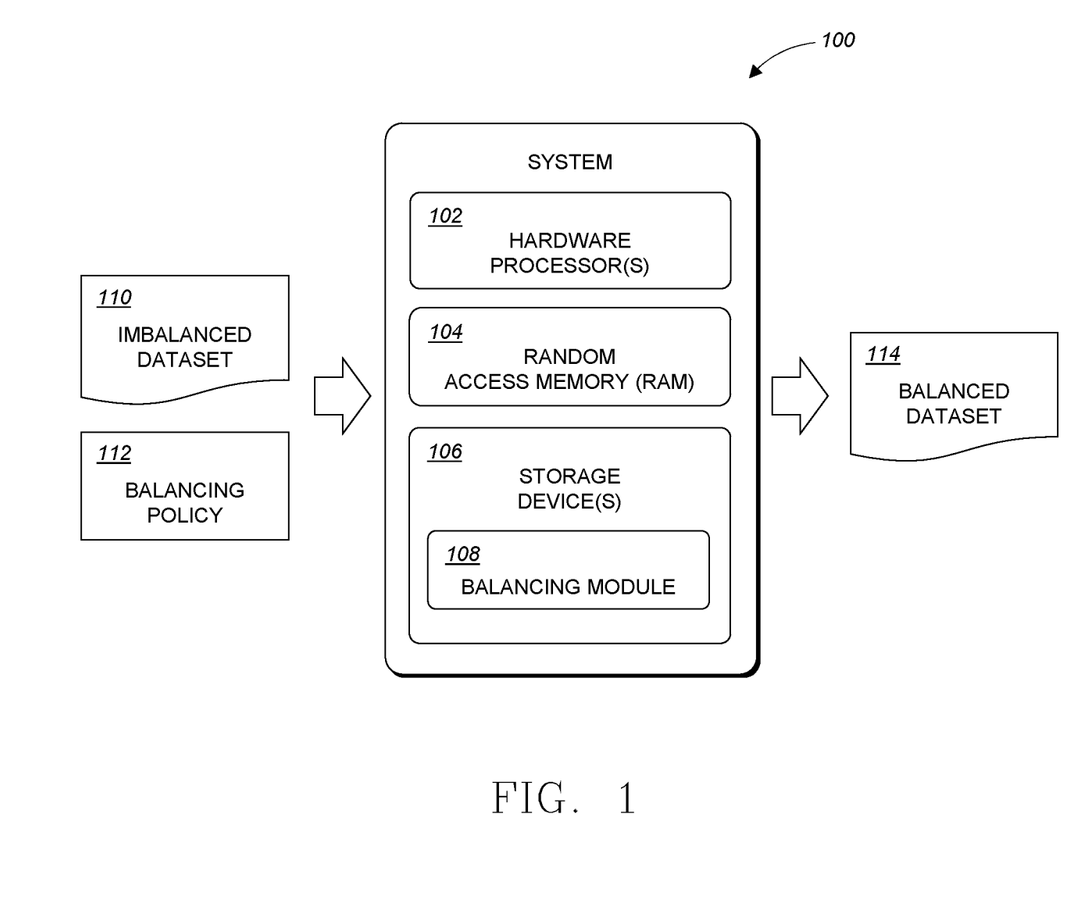
FIG. 1 is a block diagram of an exemplary system for dataset balancing, according to an embodiment.

Reference is now made to FIG. 1, which shows a block diagram of an exemplary system 100 for dataset balancing, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a balancing module 108. The software components may include an operating system having various software components and/or drivers for controlling and managing general system tasks (e.g., memory management, storage device control, power management, etc.), and facilitating communication between various hardware and software components.

System 100 may operate by loading instructions of balancing module 108 into RAM 104 as they are being executed by processor(s) 102. The instructions of balancing module 108 may cause system 100 to receive a balancing policy 112 and an imbalanced dataset 110, process them, and output a balanced dataset 114.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing "instances," "containers," "virtual machines," or other types of encapsulated software applications, as known in the art.

The instructions of balancing module 108 are now discussed with reference to the flowchart of FIG. 2, which illustrates a method 200 for dataset balancing, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise.

In step 202, an original, imbalanced dataset (denoted D), is received. The imbalanced dataset includes samples that are distributed unequally between multiple different classes.

The figure shows, for illustration purposes only, five different classes, with great variation of class sizes: the fifth class (the rightmost class in the figure) includes approximately 7 times the number of samples of the first class (the leftmost class in the figure). The second, third, and fourth classes include intermediate amounts of samples.

The term 'imbalanced dataset,' as used herein, may be a dataset in which there exists a class which is at least twice larger (in terms of number of samples) than another class. It is not uncommon to encounter imbalanced datasets with even a 1:200 ratio between the smallest class and the largest class. Even more substantially imbalanced datasets do exist. For purposes of this disclosure, 'imbalanced dataset' refers to a dataset with a ratio of between 1:2 and 1:10,000 between its smallest and largest classes, with any specific ratio or sub-range within that broader range being an optional embodiment of the invention.

The samples in the imbalanced dataset may be of any data type: text, image, video, audio, etc. All samples in the imbalanced dataset may be of the same data type.

The following description uses a text data type to describe the various embodiments of the invention. This is done, however, for demonstration purposes only. Those of skill in the art will readily recognize how to adapt the following description so that embodiments of the invention are usable with other data types.

In step 204, a balancing policy (denoted $\pi(\cdot)$) is received. The balancing policy, generally, aims to reach a specific distribution of the samples among the classes, by adding and removing samples. A simplistic example, illustrated in the Figure, is of a balancing policy that defines a certain band [$B_{low}$, $B_{high}$]—a minimal and maximal amount of samples that each class should include. Each of $B_{low}$ and $B_{high}$ may be defined in terms of a percentile. For example, $B_{low}$ may be set at the $30^{th}$ percentile and $B_{high}$ at the $70^{th}$ percentile.

Classes that are already within the band are referred to herein as well-represented (WR) classes; classes that are below the band are referred to as underrepresented (UR) classes; and classes that are above the band are referred to herein as overrepresented (OR) classes.

Figure 2:
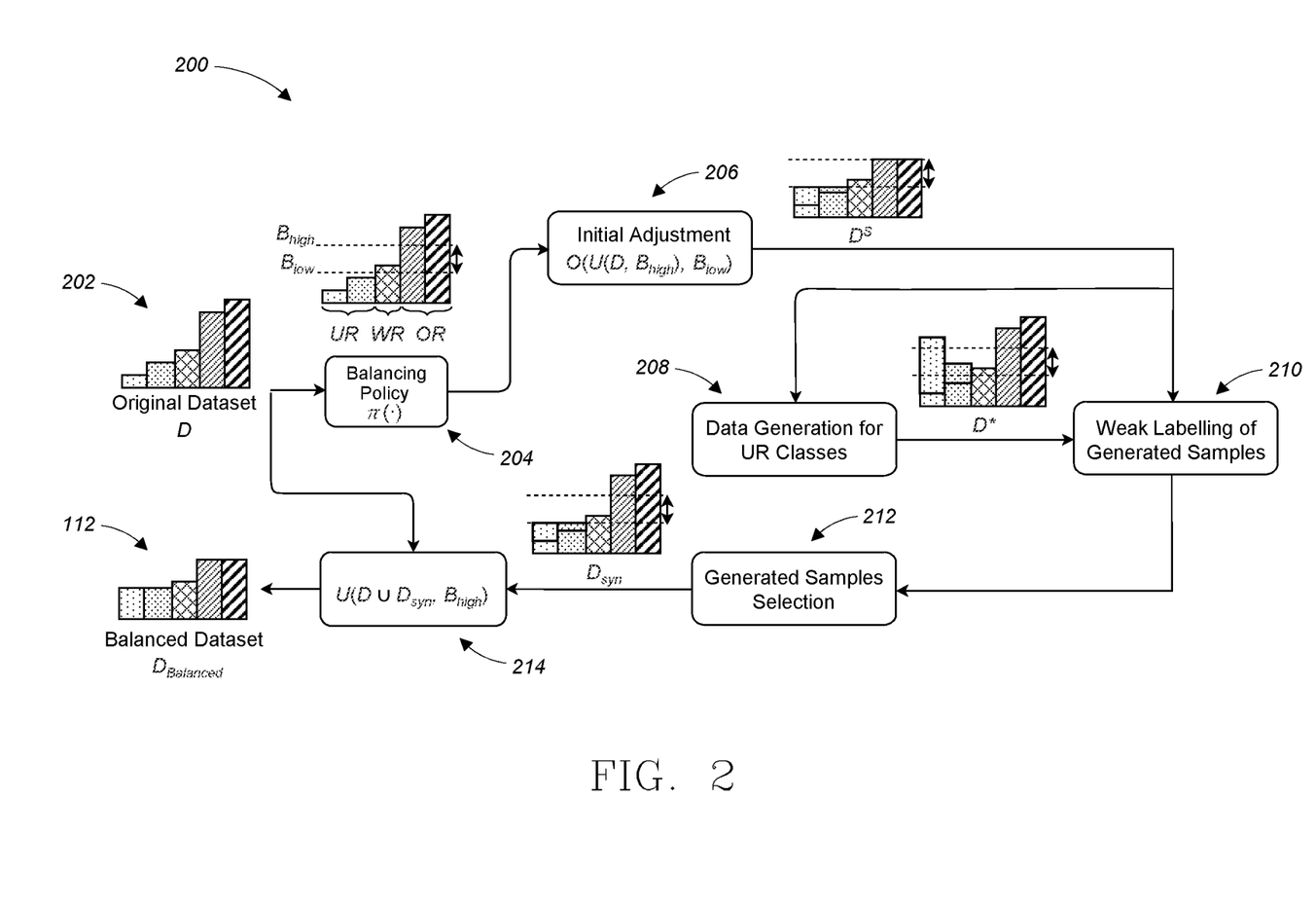
FIG. 2 is a flowchart of a method for dataset balancing, according to an embodiment.
Figure 3A:
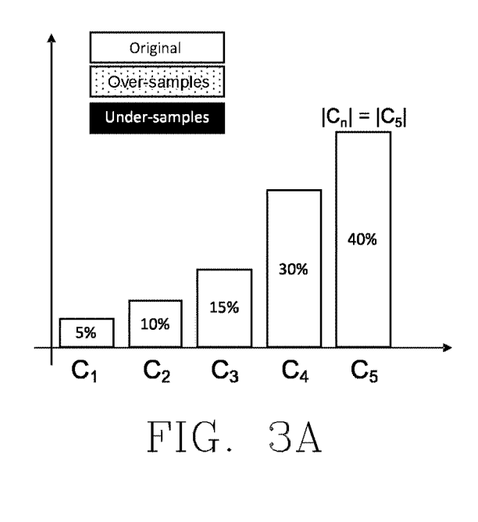
FIGS. 3A-3E are graphs of exemplary datasets and balancing policies, according to some embodiments.

Interim reference is made to FIG. 3A, which is a graph reproducing the imbalanced dataset D shown in FIG. 2, and to FIGS. 3B-3E, which show graphs illustrative of various optional balancing policies. The legend shown in FIG. 3A applies to all of FIGS. 3B-3E.

In FIGS. 3A-3E, let $c_i$ be the index of the $i^{th}$ class after sorting the classes by their size (number of samples they include) in an ascending order. Given that n is the number of classes, $|c_n|$ is the size of the largest class.

Without any balancing, $c_1$=5%, $c_2$=10%, $c_3$=15%, $c_4$=30%, and $c_5$=40%. These percentages translate to numbers, of course, according to the actual amount of samples in the imbalanced dataset.

Figure 3B:
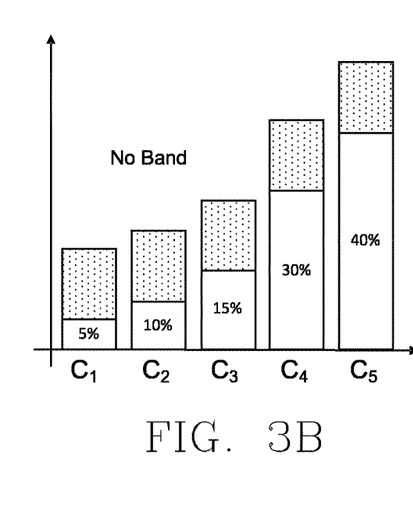

FIG. 3B illustrates a balancing policy that merely augments each class with additional samples, regardless of the original size of that class. Namely, no band is utilized.

Figure 3C:
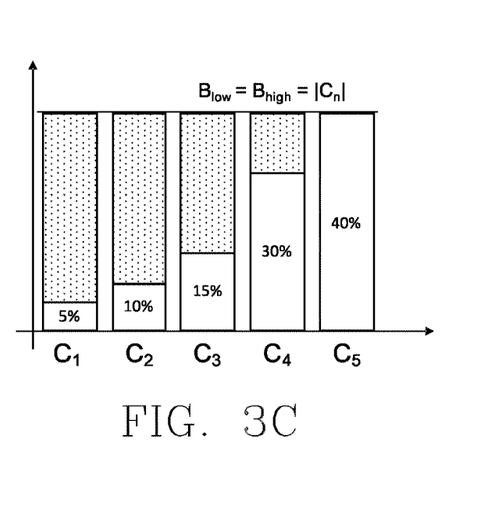

FIG. 3C illustrates a balancing policy in which $B_{low}$=$B_{high}$=$|c_n|$), namely—any class which is smaller than the largest class are augmented, to bring its size to the size of the largest class.

Figure 3D:
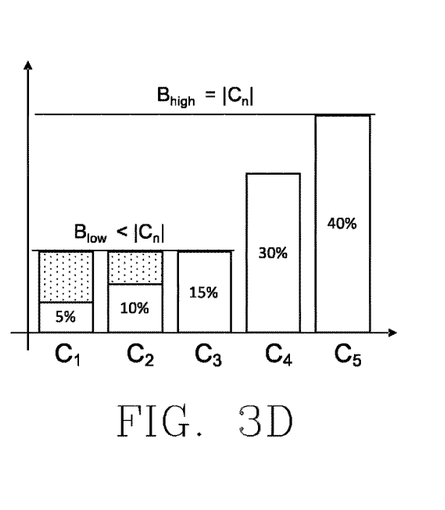

FIG. 3D illustrates a balancing policy in which $B_{low}$<$B_{high}$=$|c_n|$, namely—classes below the lower band are augmented. This could also be referred to as a single-threshold policy, the threshold being $B_{low}$.

Figure 3E:
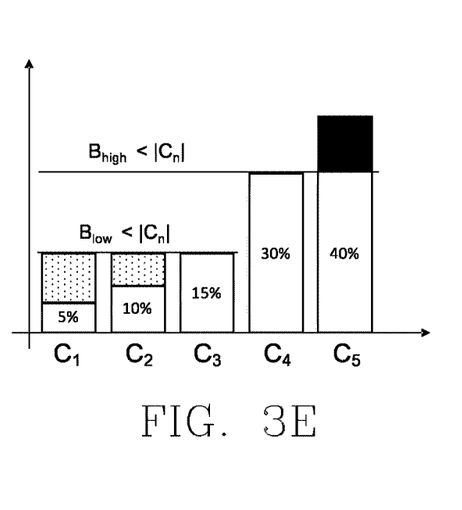

Lastly, FIG. 3E illustrates a balancing policy in which $B_{low}$<$B_{high}$<$|c_n|$, as in the example given along FIG. 2. Classes smaller than $B_{low}$ are augmented, and classes larger than $B_{high}$ are truncated.

These examples are certainly not exhaustive, and a user of method 200 may choose to set any balancing policy that transform the class size distribution to a desired one.

Back to FIG. 2, in step 206, initial adjustment of the imbalanced dataset to comply with the balancing policy may be performed. This adjustment may also be regarded as a form of naïve, simplistic balancing, which is not expected to yield a quality dataset suitable for training a machine learning classifier. The initial adjustment aims to reduce class biases of the generator and labelers discussed in steps 208 and 210 below.

The initial adjustment of step 206 may be performed by oversampling one or more of the classes which are underrepresented in the imbalanced dataset, and, if one or more of the classes are overrepresented in the imbalanced dataset, undersampling the one or more overrepresented classes.

The terms 'oversampling' and 'undersampling,' as used herein, refer to any conventional technique for adding and removing samples, respectively. For example, oversampling may include any conventional technique for ruleset-based (e.g., random or pseudo-random transformation of original samples or their features to produce new ones) or machine learning-based generation of new samples (e.g., using a generative machine learning model) or even simply duplication of samples. Undersampling, in turn, may refer to any technique to reduce the number of samples in a class, such as simplistic deletion of some samples, or combination of multiple samples into one (e.g., by averaging or otherwise jointly representing features or data of different samples).

The initial adjustment of step 206 produces an initially-adjusted dataset, denoted $D^S$. This dataset complies with the balancing policy, since all its classes are within the defined band.

Next, steps 208 through 214 are all aimed at finally balancing the imbalanced dataset, to produce the high-quality balanced dataset 112 (also of FIG. 1). In step 208, a generative machine learning model (also referred to simply as a "generator") may be operated to generate samples for the one or more underrepresented classes, based on the initially-adjusted dataset. Each of these samples is of course (weakly) labeled with its respective class label. Step 208 may include training the generative machine learning model based on the samples in the underrepresented class(es) of $D^S$, and then operating the trained model to generate the required samples, eventually yielding a dataset denoted D*. Optionally, a pre-trained machine learning model may be used, such as, for example, a language model pre-trained to generate textual output. The pre-trained model may be fine-tuned on $D^S$, and the resulting fine-tuned model may be used to generate new samples for the underrepresented classes, in order to create D*. The number of samples generated in step 208 may correspond to the number of samples missing from the underrepresented classes, according to the balancing policy. However, since some of the generated samples will be eventually discarded given their low quality (as described in connection with step 212 below), the number of samples generated in step 208 may in fact be larger than the number of samples missing from the underrepresented classes, for example by a factor of 2, 5, 10, or even more.

As step 208 completes, there are multiple new samples (weakly labeled) for the underrepresented class(es). However, not all of these newly-generated samples may be of sufficient quality for inclusion in the final, balanced dataset. Accordingly, step 210 sets the stage for a quality control mechanism, to be applied in step 212: In step 210, a machine learning classification model (also referred to as a "weak labeler" or simply "labeler") may be operated to attempt to re-label the samples generated in step 208 with class labels corresponding to the one or more underrepresented classes. The weak labeler may be any suitable, conventional classifier. In one option, only one weak labeler is used. In another option, multiple weak labelers are used; this may either include using multiple instances of the same weak labeler in order to separately label different classes, or using different weak labelers to label all classes by each such labeler.

Next, in step 212, selection of high-quality samples out of the generated samples may take place. Some of the generated samples which, according to the labeling of step 210, have a relatively high probability (compared to other ones of the generated samples) of preserving their original class labels (those assigned during the generation step 208) may be selected in this step. The result is a dataset denoted $D_{syn}$, which includes, for the underrepresented classes, their original samples plus the selected high-quality generated samples. In case the labeling of step 210 was performed by multiple different weak labelers, as in one of the options mentioned above, the selection of high-quality samples out of the generated samples may include selecting those samples whose label was agreed upon by all weak labelers, or by a voting majority of these weak labelers (e.g., more than 50%, 60%, 70%, 80%, 90%, etc.).

In step 214, the final, balanced dataset (denoted $D_{Balanced}$) 112 may be composed from: the samples from D belonging to the one or more underrepresented classes, the selected generated samples (from $D_{syn}$), and an undersampling (by any conventional method) of the samples belonging to the one or more overrepresented classes of D.

By virtue of steps 204 through 214, $D_{Balanced}$ may be suitable for use as a high-quality dataset (also "training set") for training a machine learning classification model (also "classifier") to classify new samples. In optional steps (not shown) of method 200, $D_{Balanced}$ is in fact used for such training and then for classification.

Method 200 may also be expressed by the following algorithm (demonstrating use of the method with a textual imbalanced dataset):

---

Algorithm 1

---

Input: Training dataset D
Weak labelers $\mathcal{L}_1, \ldots, \mathcal{L}_k$
(Pre-trained) language model $\mathcal{G}$
Balancing policy $\pi(\cdot)$
Oversampling method $\mathcal{OS}(\cdot,\cdot)$
Undersampling method $\mathcal{US}(\cdot,\cdot)$
1  $[B_{low}, B_{high}] \leftarrow \pi(D)$
2  $D^S \leftarrow \mathcal{OS}(\mathcal{US}(D, B_{high}), B_{low})$
3  Fine-tune $\mathcal{G}$ using $D^S$ to obtain $\mathcal{G}_{tuned}$ and synthesize a set of labeled samples for the underrepresented classes in D* using $\mathcal{G}_{tuned}$
4  $h_1 \leftarrow \mathcal{L}_1(D^S), \ldots, h_k \leftarrow \mathcal{L}_k(D^S)$
5  Select best samples in D* using weak labelers $h_1, \ldots h_k$ to obtain $D_{syn}$
6  $D_{Balanced} \leftarrow \mathcal{U}(D_{syn} \cup D, B_{high})$
7  return $D_{Balanced}$

---

EXPERIMENTAL RESULTS

To evaluate its performance, method 200 was experimentally applied to the following three datasets: the COVID-19 QA (CQA) dataset, the Stack Exchange Frequently Asked Questions (SEAQ) dataset, and the Airline Travel Information Systems (ATIS) dataset, as well as to ten additional semantic utterance classification (SUC) datasets.

The experimental setup and results are described in Tepper, N. et al., "Balancing via Generation for Multi-Class Text Classification Improvement," Findings of the Association for Computational Linguistics: EMNLP 2020, pages 1440-1452, November 2020, whose Chapter 5 ("Experiments") is incorporated herein by reference. Each detail, parameters, or the like described in that Chapter 5 is considered an optional variation of method 200.

The experiments have shown that method 200 succeeded in increasing micro and macro accuracy of prediction by a classifier trained on a dataset that was balanced by the method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:
receiving a balancing policy and an imbalanced dataset that comprises samples distributed unequally between different classes;
automatically performing initial adjustment of the imbalanced dataset to comply with the balancing policy, by:
oversampling one or more of the classes which are underrepresented in the imbalanced dataset, and
based on one or more of the classes being overrepresented in the imbalanced dataset, undersampling the one or more overrepresented classes;
operating a generative machine learning model to generate samples for the one or more underrepresented classes, based on the initially-adjusted dataset;

operating a machine learning classification model to label the generated samples with class labels corresponding to the one or more underrepresented classes;

selecting some of the generated samples which, according to the labelling, have a relatively high probability of preserving their class labels, compared to other ones of the generated samples; and composing a balanced dataset which complies with the balancing policy and comprises:
- the samples from the imbalanced dataset belonging to the one or more underrepresented classes,
- the selected generated samples, and
- based on one or more of the classes being overrepresented in the imbalanced dataset, undersampling the samples belonging to the one or more overrepresented classes in the imbalanced dataset.

2. The method of claim 1, wherein, if one or more of the classes are well-represented in the imbalanced dataset, the balanced dataset further comprises the samples belonging to the one or more well-represented classes in the imbalanced dataset.

3. The method of claim 1, wherein the balancing policy defines a specific distribution of the samples among the different classes.

4. The method of claim 3, wherein the balancing policy comprises a percentile band defining a minimal and a maximal percentile of samples allowed for each of the different classes.

5. The method of claim 1, wherein, in the initial adjustment, the oversampling comprises ruleset-based production of new samples.

6. The method of claim 1, wherein, in the initial adjustment, the oversampling comprises machine learning-based production of new samples.

7. The method of claim 1, wherein, in at least one of the initial adjustment and the balancing, the undersampling comprises deletion of some of the samples in the one or more overrepresented classes.

8. The method of claim 1, wherein, in the imbalanced dataset, a ratio between an amount of samples in a smallest one of the classes and an amount of samples in a largest one of the classes is >=1:2.

9. The method of claim 1, performed on a hardware processor of the computer in which the method is implemented.

10. A system comprising:
at least one hardware processor, and a non-transitory computer-readable storage medium having program code embodied therewith, the program code executable by said at least one hardware processor to:
receive a balancing policy and an imbalanced dataset that comprises samples distributed unequally between different classes;
automatically perform initial adjustment of the imbalanced dataset to comply with the balancing policy, by:
- oversampling one or more of the classes which are underrepresented in the imbalanced dataset, and
- based on one or more of the classes being overrepresented in the imbalanced dataset, undersampling the one or more overrepresented classes;
operate a generative machine learning model to generate samples for the one or more underrepresented classes, based on the initially-adjusted dataset;
operate a machine learning classification model to label the generated samples with class labels corresponding to the one or more underrepresented classes;
select some of the generated samples which, according to the labelling, have a relatively high probability of preserving their class labels, compared to other ones of the generated samples; and
compose a balanced dataset which complies with the balancing policy and comprises:
- the samples from the imbalanced dataset belonging to the one or more underrepresented classes,
- the selected generated samples, and
- based on one or more of the classes being overrepresented in the imbalanced dataset, undersampling the samples belonging to the one or more overrepresented classes in the imbalanced dataset.

11. The system of claim 10, wherein, if one or more of the classes are well-represented in the imbalanced dataset, the balanced dataset further comprises the samples belonging to the one or more well-represented classes in the imbalanced dataset.

12. The system of claim 10, wherein the balancing policy defines a specific distribution of the samples among the different classes.

13. The system of claim 12, wherein the balancing policy comprises a percentile band defining a minimal and a maximal percentile of samples allowed for each of the different classes.

14. The system of claim 10, wherein, in the initial adjustment, the oversampling comprises ruleset-based production of new samples.

15. The system of claim 10, wherein, in the initial adjustment, the oversampling comprises machine learning-based production of new samples.

16. The system of claim 10, wherein, in at least one of the initial adjustment and the balancing, the undersampling comprises deletion of some of the samples in the one or more overrepresented classes.

17. The system of claim 10, wherein, in the imbalanced dataset, a ratio between an amount of samples in a smallest one of the classes and an amount of samples in a largest one of the classes is >=1:2.

18. A computer program product comprising a non-transitory computer-readable storage medium having program code embodied therewith, the program code executable by at least one hardware processor to:
receive a balancing policy and an imbalanced dataset that comprises samples distributed unequally between different classes;
automatically perform initial adjustment of the imbalanced dataset to comply with the balancing policy, by:
- oversampling one or more of the classes which are underrepresented in the imbalanced dataset, and
- based on one or more of the classes being overrepresented in the imbalanced dataset, undersampling the one or more overrepresented classes;
operate a generative machine learning model to generate samples for the one or more underrepresented classes, based on the initially-adjusted dataset;
operate a machine learning classification model to label the generated samples with class labels corresponding to the one or more underrepresented classes;
select some of the generated samples which, according to the labelling, have a relatively high probability of preserving their class labels, compared to other ones of the generated samples; and
compose a balanced dataset which complies with the balancing policy and comprises:
- the samples from the imbalanced dataset belonging to the one or more underrepresented classes, the selected generated samples, and
based on one or more of the classes being overrepresented in the imbalanced dataset, undersampling the samples belonging to the one or more overrepresented classes in the imbalanced dataset.

19. The computer program product of claim 18, wherein, if one or more of the classes are well-represented in the imbalanced dataset, the balanced dataset further comprises the samples belonging to the one or more well-represented classes in the imbalanced dataset.

20. The computer program product of claim 18, wherein, in the imbalanced dataset, a ratio between an amount of samples in a smallest one of the classes and an amount of samples in a largest one of the classes is >=1:2 .

\* \* \* \* \*